(12) United States Patent
Kim

(10) Patent No.: US 10,524,591 B2
(45) Date of Patent: Jan. 7, 2020

(54) MIRROR DISPLAY APPARATUS AND THE OPERATION METHOD THEREOF

(71) Applicant: MAGIC NANNY CO., LTD, Busan (KR)

(72) Inventor: Bo Sung Kim, Busan (KR)

(73) Assignees: MAGIC NANNY CO., LTD, Busan (KR); SZM Co., Ltd., Busan (KR)

( * ) Notice: Subject to any disclaimer, the term of this patent is extended or adjusted under 35 U.S.C. 154(b) by 270 days.

(21) Appl. No.: 15/318,820

(22) PCT Filed: Sep. 1, 2016

(86) PCT No.: PCT/KR2016/009776
§ 371 (c)(1),
(2) Date: Dec. 14, 2016

(87) PCT Pub. No.: WO2017/213302
PCT Pub. Date: Dec. 14, 2017

(65) Prior Publication Data
US 2018/0206658 A1  Jul. 26, 2018

(30) Foreign Application Priority Data

Jun. 7, 2016  (KR) .......................... 10-2016-0070078

(51) Int. Cl.
*G06K 9/00* (2006.01)
*A47G 1/02* (2006.01)
(Continued)

(52) U.S. Cl.
CPC .............. *A47G 1/02* (2013.01); *A45D 42/00* (2013.01); *A45D 42/16* (2013.01);
(Continued)

(58) Field of Classification Search
CPC .......... A47G 1/02; A45D 42/00; A45D 42/16; G06K 9/00255; G06K 9/00288; H04N 5/2253
See application file for complete search history.

(56) References Cited

U.S. PATENT DOCUMENTS 9,456,146 B2 * 9/2016 Yamada ............. H04N 5/23219
9,764,694 B2 * 9/2017 Ding ......................... B60R 1/04
(Continued)

FOREIGN PATENT DOCUMENTS

KR  10-2009-0079474 A  7/2009
KR  10-1534806 B1  7/2015
(Continued)

*Primary Examiner* — Nkeisha Smith
(74) *Attorney, Agent, or Firm* — Novick, Kim & Lee, PLLC; Sang Ho Lee

(57) ABSTRACT

The present invention relates to a mirror display apparatus and a method for operating the same. The mirror display apparatus includes: a camera part for photographing a user to produce a user image; a mirror display part for displaying a user mirror image or the user image thereon; a stationary support part, an axis around which the mirror display part rotates affixed to the stationary support part; and a control part for sensing the user located in front of the mirror display apparatus on the basis of the user image, calculating an area change in a user face region displayed on the mirror display part according to the rotation of the mirror display part, and determining a location angle based on the calculated area change, the location angle being an angle between the mirror display part and the stationary support part, wherein the mirror display part is positioned according to the determined location angle.

20 Claims, 5 Drawing Sheets

(51) Int. Cl.
*H04N 5/225* (2006.01)
*A45D 42/00* (2006.01)
*A45D 42/16* (2006.01)
*G06F 3/01* (2006.01)

(52) U.S. Cl.
CPC ..... *G06K 9/00255* (2013.01); *G06K 9/00288* (2013.01); *H04N 5/2253* (2013.01); *G06F 3/01* (2013.01)

(56) References Cited

U.S. PATENT DOCUMENTS

| | | | | |
|---|---|---|---|---|
| 2005/0206736 | A1* | 9/2005 | Ng | G03B 17/02 348/208.7 |
| 2010/0315528 | A1* | 12/2010 | Goh | H04N 5/23212 348/222.1 |
| 2011/0122520 | A1* | 5/2011 | Verheyden | B60R 1/0607 359/843 |
| 2011/0254846 | A1* | 10/2011 | Lee | G06F 3/011 345/427 |
| 2013/0258512 | A1* | 10/2013 | Raz | B60R 1/07 359/843 |
| 2013/0286047 | A1* | 10/2013 | Katano | G02B 27/0101 345/633 |
| 2014/0085178 | A1* | 3/2014 | Kokkosoulis | G09G 3/3611 345/156 |
| 2014/0232816 | A1* | 8/2014 | Wilson | H04N 7/157 348/14.08 |
| 2015/0030207 | A1* | 1/2015 | Sikroria | B60R 1/07 382/104 |
| 2015/0102995 | A1* | 4/2015 | Shen | G06F 3/013 345/156 |
| 2016/0093081 | A1* | 3/2016 | Kim | G06F 3/012 345/156 |
| 2017/0262053 | A1* | 9/2017 | Noh | G06F 3/013 |
| 2017/0263215 | A1* | 9/2017 | Han | G06F 3/011 |

FOREIGN PATENT DOCUMENTS

| | | |
|---|---|---|
| KR | 10-2015-0108571 A | 9/2015 |
| KR | 10-2016-0037074 A | 4/2016 |

* cited by examiner

MIRROR DISPLAY APPARATUS AND THE OPERATION METHOD THEREOF

TECHNICAL FIELD

The present invention relates to a mirror display apparatus and a method for operating the same, and, more particularly, to a mirror display apparatus and a method for operating the same that are capable of changing a rotation angle according to a user's position.

BACKGROUND ART

FIG. 1 is a perspective view showing a conventional mirror. As shown, the mirror includes a mirror part 120 for displaying a user's mirror image and a support part 110 for rotatably supporting the mirror part 120. So as to provide an optimal mirror image for the user, accordingly, the mirror part 120 should rotate appropriately according to the position of the user's face. However, it is inconvenient to rotate the mirror part 120, and further, the mirror part 120 after rotating is not stably fixed. Particularly, the rotation angle for providing the optimal mirror image may be undesirably changed at the moment when the mirror part 120 moves through the rotation by the user.

Moreover, a smart mirror product, which is made by applying an IoT (Internet of Things) technology to the conventional mirror, has been recently developed. In this case, the smart mirror just provides various information on the mirror screen for the user. However, the mirror screen of the smart mirror is fixed in position itself, and otherwise, it should be changed directly in position by the user.

Therefore, there is a need for the development of a mirror display apparatus and a method for operating the same that are capable of solving the above-mentioned problems.

DISCLOSURE

Technical Problem

Accordingly, the present invention has been made in view of the above-mentioned problems occurring in the prior art, and it is an object of the present invention to provide a mirror display apparatus and a method for operating the same that are capable of changing a rotation angle according to a user's position.

Further, the technical problems to be solved by the present invention may be not limited as the above-mentioned problems, and various technical problems can be derived from the description as will be discussed hereinafter within the technical scope of the invention which is obvious to those skilled in the art.

Technical Solution

To accomplish the above-mentioned object, according to a first aspect of the present invention, described below is a method for operating a mirror display apparatus, the mirror display apparatus having a mirror display part and a support part for supporting the mirror display part, including the steps of: sensing a user located in front of the mirror display apparatus; rotating the mirror display part; calculating a size change in a user face region displayed on the mirror display part; determining a location angle of the mirror display part with respect to the support part on the basis of the size change in the user face region; and rotating and positioning the mirror display part according to the determined location angle of the mirror display part.

According to the present invention, desirably, the location angle is a rotation angle of the mirror display part when the size of the user face region has a maximum value.

According to the present invention, desirably, the method further includes the step of inverting the rotation direction of the mirror display part according to the size change in the user face region.

Further according to the present invention, desirably, the method further includes the step of determining whether the mirror display part rotates after the mirror display part has been positioned.

Yet further according to the present invention, desirably, if the size change in the user face region is greater than a given threshold value in the step of determining whether the mirror display part rotates, the mirror display part rotates.

According to the present invention, desirably, if the direction of the user's face or view is changed to a horizontal direction within the step of determining whether the mirror display part rotates, the mirror display part does not rotate.

According to the present invention, desirably, the method further includes the step of changing one of magnification and resolution of the image displayed on the mirror display part according to the user's facial expression.

According to the present invention, desirably, the method further includes the step of displaying a given content through the mirror display part on the basis of an isolation distance between the user and the mirror display apparatus or the user's gestures.

According to the present invention, desirably, there is provided a computer-readable recording medium in which a program is recorded to conduct the method for operating a mirror display apparatus.

To accomplish the above-mentioned object, according to a second aspect of the present invention, there is provided a mirror display apparatus including: a camera part for photographing a user to produce a user image; a mirror display part for displaying a user mirror image or the user image thereon; a support part for supporting and rotating the mirror display part; and a control part for sensing the user located in front of the mirror display apparatus on the basis of the user image, calculating a size change in a user face region displayed on the mirror display part according to the rotation of the mirror display part, and determining a location angle of the mirror display part with respect to the support part on the basis of the size change, wherein the support part rotates and positions the mirror display part according to the determined location angle.

According to the present invention, desirably, the location angle is a rotation angle of the mirror display part when the size of the user face region has a maximum value.

According to the present invention, desirably, the control part inverts the rotation direction of the mirror display part by the support part according to the size change in the user face region.

According to the present invention, desirably, the control part determines whether the mirror display part rotates after the mirror display part has been positioned by means of the support part.

According to the present invention, desirably, the control part determines that the mirror display part rotates if the size change in the user face region is greater than a given threshold value.

According to the present invention, desirably, the control part determines that the mirror display part does not rotate if the direction of the user' face or view is changed to a horizontal direction.

According to the present invention, desirably, the control part changes one of magnification and resolution of the image displayed on the mirror display part according to the user's facial expression.

According to the present invention, desirably, the control part displays a given content through the mirror display part on the basis of an isolation distance between the user and the mirror display apparatus or the user's gestures.

Advantageous Effects

According to the present invention, the mirror display apparatus is capable of rotating the mirror display part according to the position of the user's face, thereby providing an optimal screen angle.

According to the present invention, in addition, the mirror display apparatus is capable of rotating and positioning the mirror display part on the basis of the size change in the user face region, thereby preventing the mirror display part from being unexpectedly operated according to the change in the user face angle or in the user view.

According to the present invention, further, the mirror display apparatus is capable of displaying a given content, thereby serving as an electronic picture frame.

According to the present invention, furthermore, the mirror display apparatus is capable of adjusting the magnification of the user image according to the user's gestures or the isolation distance between the user and the mirror display apparatus, so that if the user is relatively distant from the mirror display apparatus or even if the user has poor eyesight, the magnified image can be checked to remove an inconvenience wherein the user has to be close to the mirror display apparatus.

DESCRIPTION OF DRAWINGS

In order to facilitate the general understanding of the present invention in describing the present invention, the accompanying drawings will be briefly explained below.

BEST MODE FOR INVENTION

Figure 1:
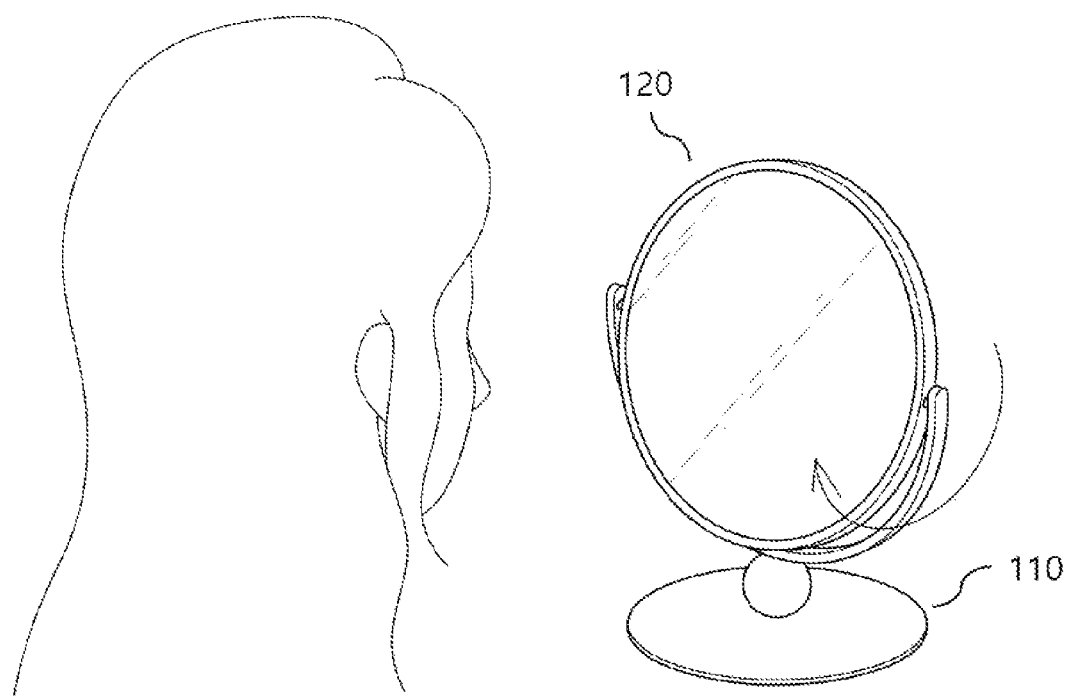
FIG. 1 is a perspective view showing a conventional mirror.

The present invention is disclosed with reference to the attached drawings wherein the corresponding parts in the embodiments of the present invention are indicated by corresponding reference numerals and the repeated explanation on the corresponding parts will be avoided. If it is determined that the detailed explanation on the well-known technology related to the present invention makes the scope of the present invention not clear, the explanation will be avoided for the brevity of the description. Before the present invention is disclosed and described, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure.

The term 'coupled' or 'connected', as used herein, is defined as connected 'directly' as well as connected 'indirectly' while having any component disposed there between. In this application, terms, such as "comprise", "include", or "have", are intended to designate those parts which are described in the specification, and it should be understood that they do not preclude the possibility of the existence additional parts. Terms, such as the first, the second, A, B, (a) and (b) may be used to describe various elements, but the elements should not be restricted by the terms. The terms are used to only distinguish one element from the other element, and accordingly, the characteristics and sequences of the elements are not limited by the terms.

Figure 2:
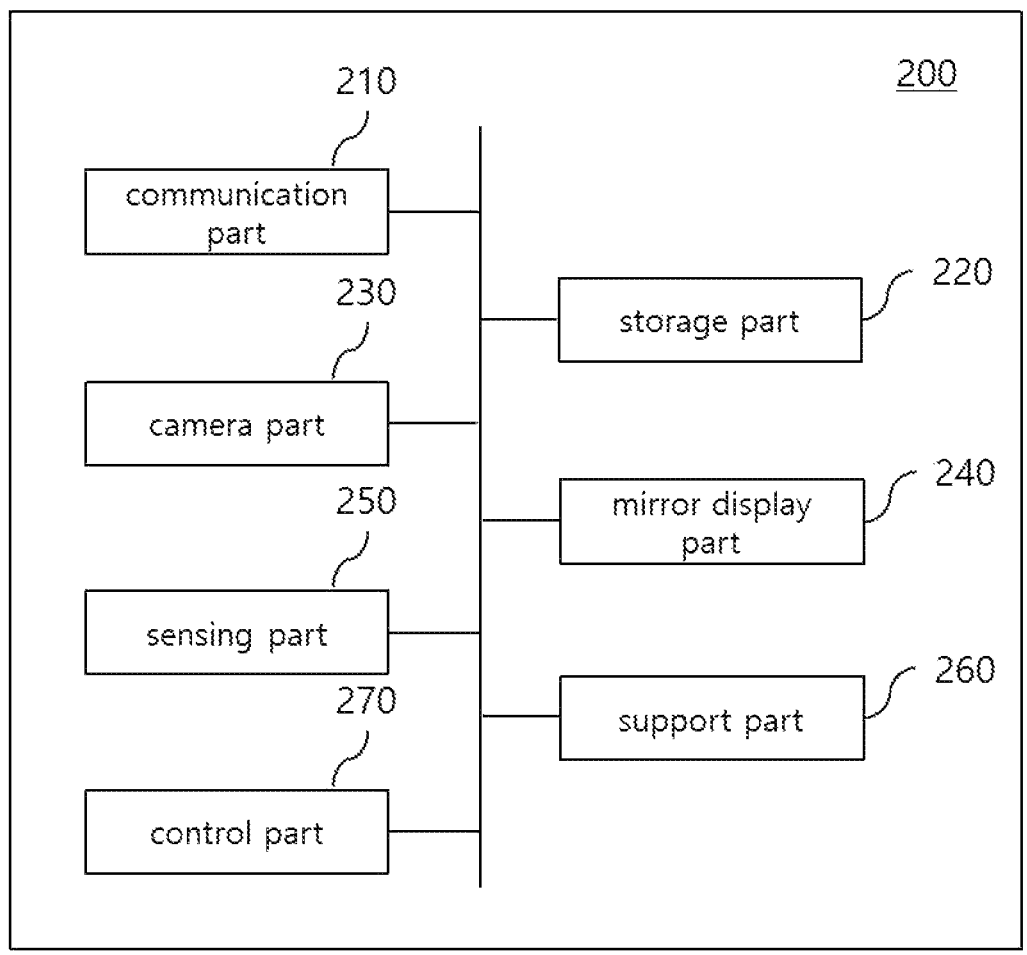
FIG. 2 is a block diagram showing a structure of a mirror display apparatus according to the present invention.

FIG. 2 is a block diagram showing a structure of a mirror display apparatus according to the present invention.

Referring to FIG. 2, a mirror display apparatus 200 according to the present invention includes a communication part 210, a storage part 220, a camera part 230, a mirror display part 240, a sensing part 250, a support part 260, and a control part 270.

The communication part 210 is a wired and/or wireless communication part for the direct connection to the outside or for the connection to the outside through a network. In more detail, the communication part 210 transmits data received from the control part 270 and the storage part 220 wired or wirelessly and receives data from the outside to transmit the received data to the control part 270 or to store the received data in the storage part 220. The data includes the contents of text, image, and video, a user image and so on. The communication part 210 makes use of LAN (Local Area Network), WCDMA (Wideband Code Division Multiple Access), LTE (Long Term Evolution), WiBro (Wireless Broadband Internet), RF (Radio Frequency) communication, wireless LAN, Wireless Fidelity, NFC (Near Field Communication), Bluetooth, infrared communication and so on. However, they are just exemplary, and accordingly, a variety of wired and wireless communication technologies applicable to the technical fields in the art may be adopted according to the embodiments of the present invention.

The storage part 220 stores various data related to the operations of the mirror display apparatus 200 according to the present invention. The data includes given contents, the user image and so on. The storage part 220 is one of a variety of storage devices into and from which information is input or outputted, such as an HDD (Hard Disk Drive), ROM (Read Only Memory), RAM (Random Access Memory), EEPROM (Electrically Erasable and Programmable Read Only Memory), flash memory, CF (Compact Flash) card, SD (Secure Digital) card, SM (Smart Media) card, MMC (Multimedia) card, memory stick and so on. The storage part 220 is disposed inside the mirror display apparatus 200, and otherwise, it may be located at a separate device.

The camera part 230 photographs a user to produce a user image. At this time, the user is generally positioned in front of the mirror display apparatus 200, but while being particularly limited thereto, he or she may be located at an arbitrary place around the mirror display apparatus 200. So as to photograph the user, the camera part 230 according to the present invention is disposed toward a given direction or rotatable and/or movable, and at least one camera part 230 is provided.

The mirror display part 240 operates in a variety of operation modes through the adjustment of transmittance and reflectivity. In more detail, the mirror display part 240 displays the user image in a screen mode, a given content in a frame mode, and a mirror image through the reflection of an object (user, etc.) located in front of the mirror display apparatus 200 (especially, the mirror display unit 240).

The sensing part 250 serves to sense the user around the mirror display apparatus 200. The sensing part 250 senses the location, distance and contact of the user, and accordingly, it may include a touch sensor, an infrared sensor and so on. However, the sensing part 250 is not particularly limited thereto.

The support part 260 serves to support the mirror display part 240 through the coupling to the mirror display part 240. Particularly, the support part 260 rotates the mirror display part 240, and so as to rotate the mirror display part 240, the support part 260 is connected with the mirror display part 240 through a rotary shaft having a given direction. The rotary shaft is formed of a horizontal rotary shaft, but is limited thereto. According to the rotation of the mirror display part 240, the user image displayed through the mirror display part 240 may be changed.

The control part 270 controls the whole operation of the mirror display apparatus 200 and the signal flows of the respective parts of the mirror display apparatus 200 and performs data processing functions.

In more detail, the control part 270 determines the operating modes of the mirror display part 240 to allow the mirror display part 240 to be operated according to the determined result. In this case, the operating modes include the screen mode and the mirror mode, and according to another embodiment of the present invention, they further include the frame mode. In the screen mode, the control part 270 produces a second user image that is made by inverting a first user image to left and right sides and allows the mirror display part 240 to display the second user image, and in the frame mode, the control part 270 allows the mirror display part 240 to display the given content stored in the storage part 220 or received from the communication part 210. In the mirror mode, the control part 270 displays the mirror image through the adjustment of the transmittance and reflectivity of the mirror display part 240.

Further, the control part 270 controls the start/stop of the rotation of the mirror display part 240, the rotation direction thereof and so on, and according to the rotation of the mirror display part 240, the control part 270 calculates a size change in a user face region from the user image photographed by the camera part 230. With the calculated result, the control part 270 determines the location angle of the mirror display part 240 with respect to the support part 260 and positions the mirror display part 240 according to the location angle of the mirror display part 240.

Now, a detailed operation of the control part 270 will be explained with reference to FIGS. 3 to 5.

Figure 3:
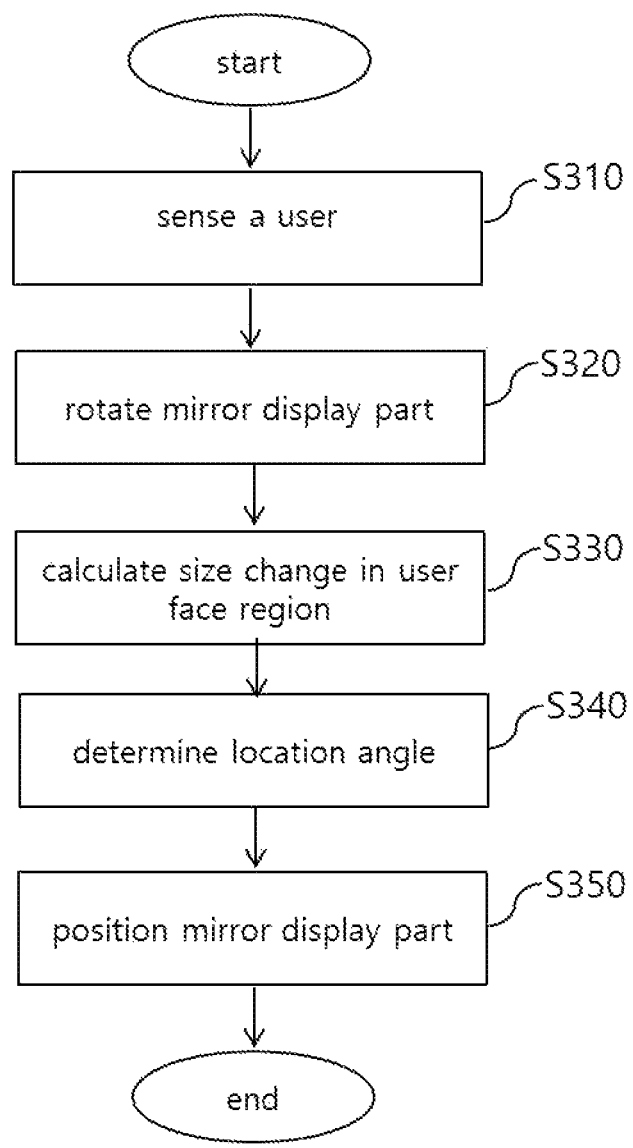
FIG. 3 is a flow chart showing a method for operating a mirror display apparatus according to the present invention.

FIG. 3 is a flow chart showing a method 300 for operating a mirror display apparatus according to the present invention.

At step S310, first, a user, who is located in front of the mirror display apparatus 200, is sensed. The sensing operation is carried out by means of the control part 270 through the user image photographed by the camera part 230 and/or through the analysis of the user sensing result of the sensing part 260. Further, the front of the mirror display apparatus 200 means a direction toward which the screen of the mirror display part 240 is positioned.

At step S320, the mirror display part 240 rotates. The rotation is carried out by means of the support part 260 supporting the mirror display part 240, and so as to rotate the mirror display part 240, the support part 260 is connected with the mirror display part 240 through the rotary shaft having a given direction. For example, the rotary shaft is formed of a horizontal rotary shaft, but is limited particularly thereto. According to the rotation of the mirror display part 240, the user image displayed through the mirror display part 240 may be changed.

At step S330, the control part 270 calculates the size change in the user face region displayed on the mirror display part 240. In more detail, the control part 270 extracts the user image, especially, the user face region from the images displayed on the mirror display part 240 and calculates the size of the user face region extracted from the image display region (or screen) of the mirror display part 240. As the user image is continuously changed according to the rotation of the mirror display part 240 at the step S320, particularly, the control part 270 calculates the size of the user face region for the user image continuously changed and obtains a series of size changes (for example, increment and decrement) of the user face region.

At step S340, the control part 270 determines the location angle of the mirror display part 240 on the basis of the size change in the user face region calculated at the step S330. The location angle means the rotation angle of the mirror display part 240 with respect to the support part 260 (particularly, the rotary shaft of the support part 260), and the control part 270 determines the rotation angle of the mirror display part 240 when the size of the user face region calculated at the step S330 has a maximum value as the location angle of the mirror display part 240. For example, the control part 270 can determine the size of the user face region at the moment when the user face region is decreased after increased as a maximum value.

At step S350, the support part 260 rotates and positions the mirror display part 240 according to the location angle of the mirror display part 240. That is, the support part 260 positions the mirror display part 240 according to the location angle determined at the step S340, and if the step S350 is carried out, the steps S320 to S340 are finished. Accordingly, the mirror display part 240 does not continuously rotate, but is fixedly positioned, so that the mirror display apparatus 200 can be used at an angle where the user's face is best seen.

According to the present invention, the method 300 for operating the mirror display apparatus 200 further includes the step of inverting the rotation direction of the mirror display part 240 by means of the control part 270 according to the size change in the user face region.

At the step S330 where the size change in the user face region is calculated through the control part 270, that is, if the size of the user face region is gradually decreased according to the rotation of the mirror display part 240, the control part 270 determines that the mirror display part 240 is inverted in the rotation direction thereof, and as a result, the support part 260 rotates the mirror display part 240 inversely. This means that there is no need to rotate the mirror display part 240 from the first in a direction where the size of the user face region is decreased at the step S340 so as to determine the moment when the size of the user face region has a maximum value (that is, the moment when the size of the user face region is decreased after increased).

According to the present invention, the method 300 for operating the mirror display apparatus 200 further includes the step of changing one of magnification and resolution of the image displayed on the mirror display part 240 through the control part 270. For example, the changing operation is based on an isolation distance between the user and the mirror display apparatus 200. In more detail, if the isolation distance is long, at least one of the magnification and resolution of the user image is increased, and contrarily, if short, at least one thereof is decreased. For another example, the changing operation is based on the user's gestures. In more detail, the control part 270 analyzes the user image, and if the user takes a given gesture, for example, if his or her eyes wear a frown, at least one of the magnification and resolution of the user image is increased.

According to the present invention, the method 300 for operating the mirror display apparatus 200 further includes the step of displaying a given content through the mirror display part 240. Through the step of displaying a given content through the mirror display part 240, the mirror display apparatus 200 serves as an electronic picture frame, and the step is carried out on the basis of the isolation distance between the user and the mirror display apparatus 200 and/or the user's gestures. For example, the step is carried out when the isolation distance is longer than a given reference distance. That is, if the user is distant from the mirror display apparatus 200, it means that the user does not want to inspect themselves by way of the mirror, and at that time, accordingly, the given content is displayed. For another example, the step is carried out on the basis of the user's gestures. In this case, the user's gestures are recognized by means of the analysis of the user image and/or the analysis of the user sensing result through the sensing part 250. For example, the user's gestures include operations with special patterns, touch operations with the surface or switch of the mirror display part 240 and/or the mirror display apparatus 200, and the like, but are not limited especially thereto.

Figure 4:
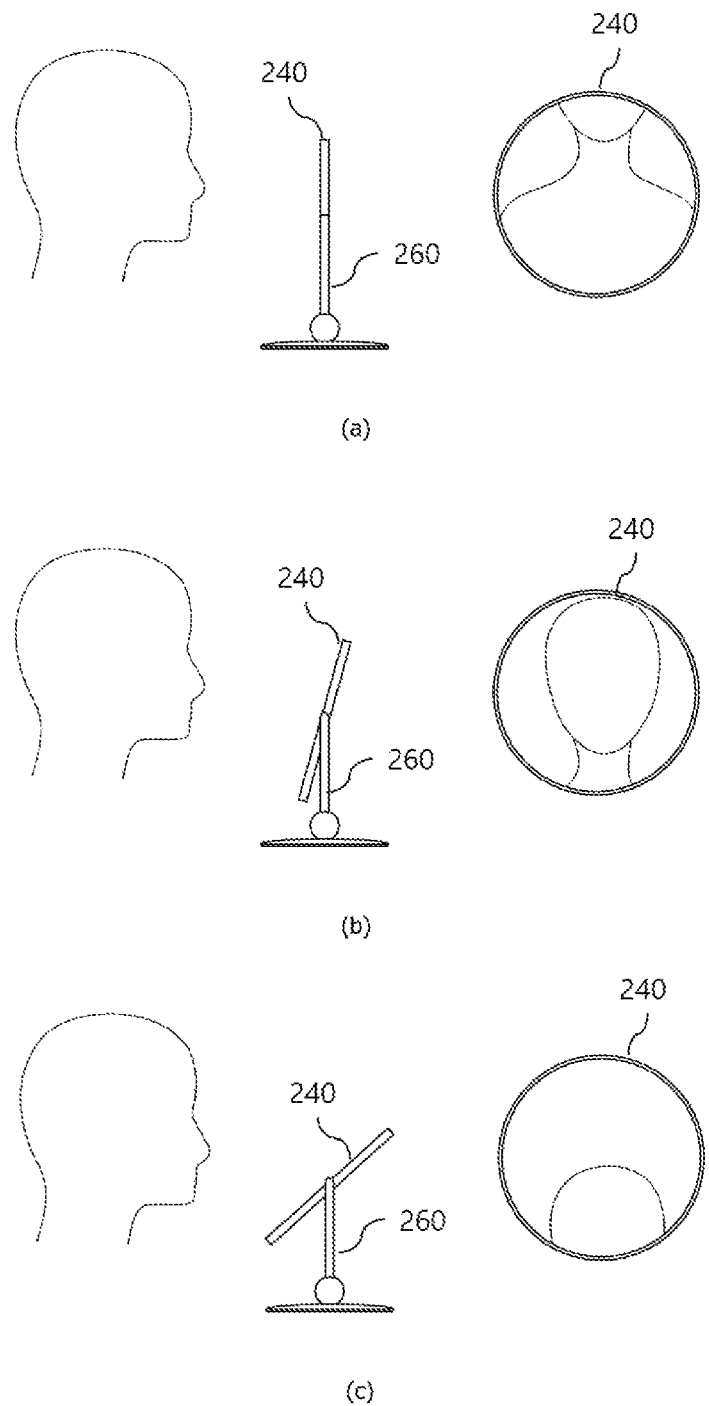
FIG. 4 shows examples of operations of the mirror display apparatus according to the present invention.

FIG. 4 shows perspective views showing examples of operations of the mirror display apparatus according to the present invention.

As shown in FIG. 4, the mirror display part 240 rotates according to the user sensing result, and according to the rotation of the mirror display part 240, the user image displayed on the mirror display part 240 may be changed.

In the state where the location angle of the mirror display part 240 with respect to the support part 260 is 0 (see (a) of FIG. 4), if the location angle becomes gradually increased, the size of the user face region gets increased (see (b) of FIG. 4). In the state where the size of the user face region has a maximum value (see (b) of FIG. 4), further, if the mirror display part 240 continuously rotates, the size of the user face region gets decreased (see (c) of FIG. 4).

While the mirror display part 240 is rotating, the control part 270 calculates the size change in the user face region and thus determines the location angle of the mirror display part 240 at which the size of the user face region has the maximum value. Accordingly, the control part 270 rotates and positions the mirror display part 240 according to the determined location angle.

Figure 5:
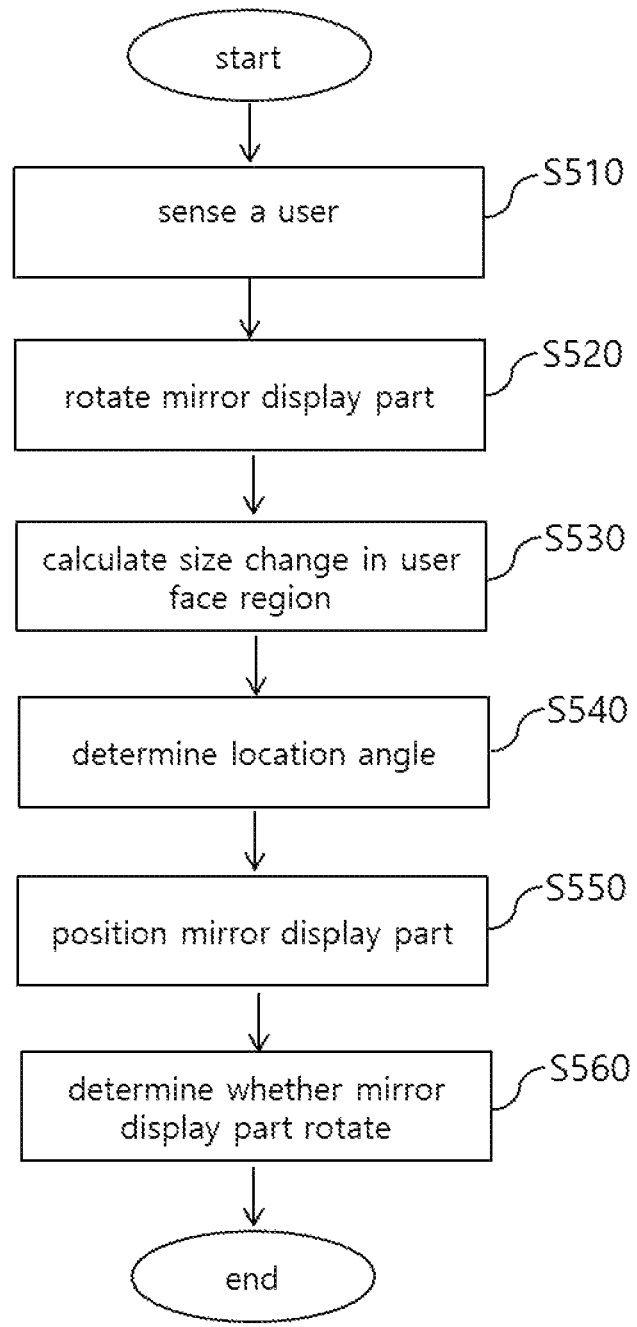
FIG. 5 is a flow chart showing another method for operating a mirror display apparatus according to the present invention.

FIG. 5 is a flow chart showing another method 500 for operating a mirror display apparatus according to the present invention.

Steps S510 to S550 in the method 500 are the same as the steps S310 to S350 of the method 300 in FIG. 3, and therefore, the repeated explanations on them will be avoided below.

At step S560, the control part 270 determines whether the mirror display part 240 rotates or not.

After the step S550 wherein the control part 270 rotates and positions the mirror display part 240, that is, after the mirror display part 240 is fixedly positioned, the step S560 is carried out. In more detail, the control part 270 calculates the size change in the user face region displayed on the mirror display part 240, and if the size change is greater than a given threshold value, the control part 270 determines that the mirror display part 240 rotates. At the step S560, if the control part 270 determines that the mirror display part 240 rotates, the returning operation to the step S520 is carried out.

According to the present invention, the step S560 further includes the step of recognizing a direction of the user's face or view. After the recognition result, if the direction of the user' face or view is changed to a horizontal direction, the control part 270 determines that the mirror display part 240 does not rotate even though the size change is greater than the given threshold value.

On the other hand, the embodiments of the present invention may be implemented by hardware, middleware, microcode, software, and/or any combination thereof. For example, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, control parts, micro-control parts, microprocessors, or other electronic units designed to perform the functions described above, and/or a combination thereof.

For example, further, the embodiments of the present invention are recorded or encoded in computer readable media including commands. The commands recorded or encoded in the computer readable media allow a programmable processor or another processor to perform methods when they are implemented. The computer readable media include computer storage media, and communication media having arbitrary media easily transferring computer programs from one place to another place. The storage media may be arbitrary available media accessible by computers. For example, the computer readable media include random access memory (RAM), read-only memory (ROM), electrically erasable programmable read-only memory (EEPROM), compact disk read-only memory (CD-ROM) or other optical disk storage medium, magnetic disk storage medium or other magnetic storage device, or an arbitrary medium used to restore or store desired program codes to the form of commands or data structures accessible by computers.

The hardware, software, firmware and so on are implemented in the same device or individual devices to support the various operations and functions described in the present invention. Additionally, the units, modules, components as described by the term 'parts' of the present invention may be individually formed as interoperable logic devices. The description on the different characteristics of the modules, units and the like is intended to emphasize the different functional embodiments of the present invention, and it does not mean that they should be operated by the individual hardware or software components. On the contrary, the functions related to one or more modules or units are performed by the individual hardware or software components or may be integrated by the common or individual hardware or software components.

The operations are indicated in the drawings in specific steps, but it should be understood that the illustrated specific steps, the sequential steps, or all the specific steps are not necessarily carried out so as to accomplish desired results. In arbitrary environments, multitasking and parallel processing are more advantageous. Furthermore, it should be understood that the classification of the various components is not needed for all the embodiments of the present invention and that the described components are integrated as a single software product or packaged as a plurality of software products.

As mentioned above, the preferred embodiment of the present invention has been disclosed in the specification and drawings. In the description of the present invention, special terms are used not to limit the present invention and the scope of the present invention as defined in claims, but just to explain the present invention. Therefore, persons skilled in the relevant art can appreciate that many modifications and variations are possible in light of the above teachings. It is therefore intended that the scope of the invention be limited not by this detailed description, but rather by the claims appended hereto.

The invention claimed is:

1. A method for operating a mirror display apparatus, the mirror display apparatus having a stationary support part and a mirror display part rotating around an axis affixed to the stationary support part, the method comprising the steps of:
   sensing a user located in front of the mirror display apparatus and capturing a user face region in the mirror display part;
   rotating the mirror display part in a first rotation direction;
   while the mirror display part rotates, calculating an area of the user face region in the mirror display part, wherein the area of the user face region continuously changes;
   determining, by a processor, a location angle based on a calculation of the area of the user face region, the location angle being an angle between the mirror display part and the stationary support part, wherein the location angle is determined when the area of the user face region in the mirror display part has a maximum value; and
   rotating and positioning the mirror display part according to the location angle.

2. The method according to claim 1, wherein the location angle is determined when the area of the user face region in the mirror display part has a value which is decreased after increased.

3. The method according to claim 1, wherein the axis affixed to the stationary support part is in a horizontal direction.

4. The method according to claim 1, further comprising the step of inverting a rotation direction of the mirror display part from the first rotation direction to a second rotation direction if the area of the user face region in the mirror display part is gradually decreased according to the rotation of the mirror display part.

5. The method according to claim 1, further comprising the step of determining whether the mirror display part rotates after the mirror display part has been positioned.

6. The method according to claim 5, wherein the step of determining whether the mirror display part rotates after the mirror display part has been positioned comprises determining whether the mirror display part rotates when an area change in the user face region is greater than a threshold value.

7. The method according to claim 5, wherein the step of determining whether the mirror display part rotates after the mirror display part has been positioned comprises not rotating the mirror display part when a direction of a user's face or view is changed to a horizontal direction.

8. The method according to claim 1, further comprising the step of changing one of magnification and resolution of an image displayed in the mirror display part according to the user's facial expression.

9. The method according to claim 1, further comprising the step of changing one of magnification and resolution of the image displayed in the mirror display part based on an isolation distance or the user's gestures, the isolation distance being a distance between the user and the mirror display apparatus.

10. The method according to claim 1, further comprising the step of displaying a given content in the mirror display part based on an isolation distance or the user's gestures, the isolation distance being a distance between the user and the mirror display apparatus.

11. A non-transitory computer-readable recording medium in which a program is recorded to conduct the method according to claim 1.

12. A mirror display apparatus comprising:
   a camera part photographing a user to produce a user image;
   a mirror display part displaying a user mirror image or the user image thereon;
   a stationary support part, the mirror display part rotating around an axis affixed to the stationary support part in a first rotation direction; and
   a control part sensing the user located in front of the mirror display apparatus by using the user image, while the mirror display part rotates, calculating an area of a user face region displayed on the mirror display part, wherein the area of the user face region continuously changes, and determining, by a processor, a location angle based on a calculation of the area of the user face region in the mirror display part, the location angle being an angle between the mirror display part and the stationary support part,
   wherein the location angle is determined when the area of the user face region in the mirror display part has a maximum value, and
   wherein the mirror display part is positioned according to the location angle.

13. The mirror display apparatus according to claim 12, wherein the location angle is determined when the area of the user face region in the mirror display part has a value which is decreased after increased.

14. The mirror display apparatus according to claim 12, wherein the axis affixed to the stationary support part is in a horizontal direction.

15. The mirror display apparatus according to claim 12, wherein the control part inverts a rotation direction of the mirror display part from the first rotation direction to a second rotation direction if the area of the user face region in the mirror display part is gradually decreased according to the rotation of the mirror display part.

16. The mirror display apparatus according to claim 12, wherein the control part determines whether the mirror display part rotates after the mirror display part has been positioned.

17. The mirror display apparatus according to claim 16, wherein the control part determines whether the mirror display part rotates when an area change in the user face region is greater than a threshold value.

18. The mirror display apparatus according to claim 16, wherein the control part determines that the mirror display part does not rotate when a direction of a user's face or view is changed to a horizontal direction.

19. The mirror display apparatus according to claim 12, wherein the control part changes one of magnification and resolution of an image displayed on the mirror display part according to an isolation distance, the user's gestures, or the user's facial expression, the isolation distance being a distance between the user and the mirror display apparatus.

20. The mirror display apparatus according to claim 12, wherein the control part displays a given content on the mirror display part based on an isolation distance or the user's gestures, the isolation distance being a distance between the user and the mirror display apparatus.

\* \* \* \* \*